No. 665,865. Patented Jan. 15, 1901.
H. R. BAKER.
MOLD FOR CASTING TUBULAR SHELLS.
(Application filed Jan. 10, 1900.)
(No Model.)
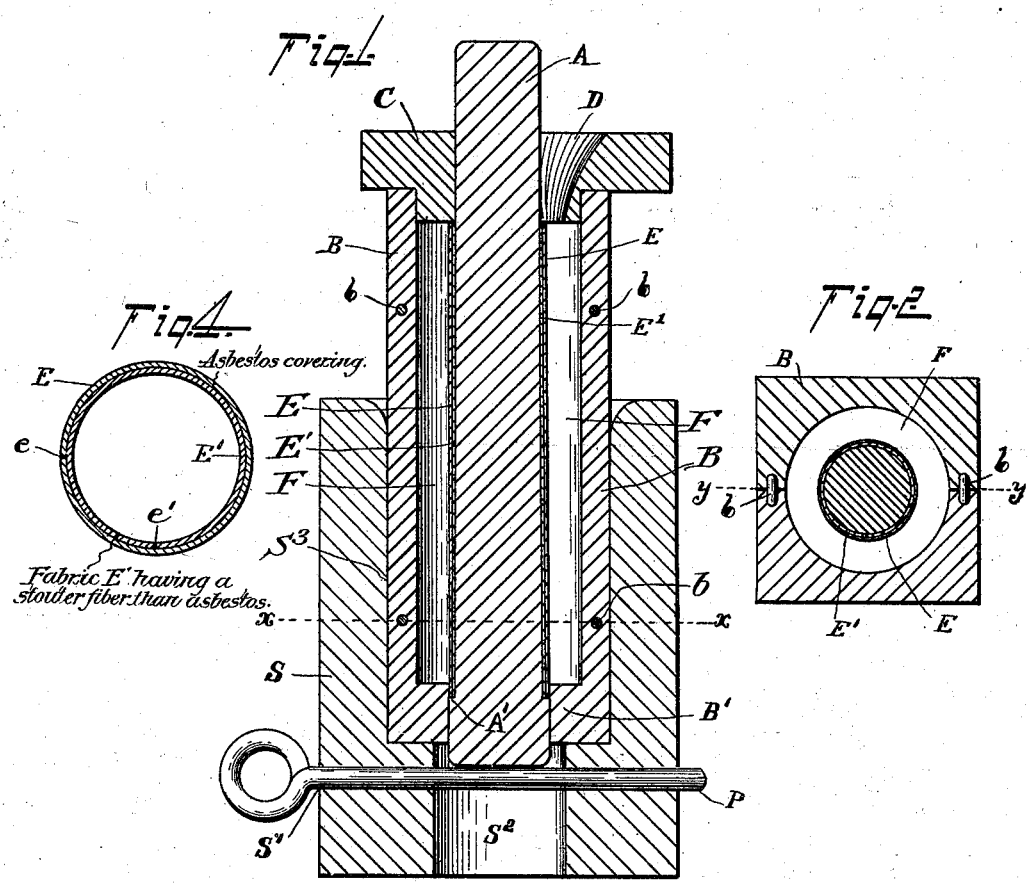
WITNESSES:
Walter C. Pusey
Joshua Pusey
INVENTOR
Henry R. Baker
BY
Isaac W. Heysinger
ATTORNEY

UNITED STATES PATENT OFFICE.

HENRY R. BAKER, OF NORTH ATTLEBOROUGH, MASSACHUSETTS, ASSIGNOR, BY MESNE ASSIGNMENTS, OF ONE-HALF TO THE R. F. SIMMONS COMPANY, OF ATTLEBOROUGH, MASSACHUSETTS.

MOLD FOR CASTING TUBULAR SHELLS.

SPECIFICATION forming part of Letters Patent No. 665,865, dated January 15, 1901.

Application filed January 10, 1900. Serial No. 943. (No model.)

*To all whom it may concern:*

Be it known that I, HENRY R. BAKER, a citizen of the United States, residing at North Attleborough, in the county of Bristol and State of Massachusetts, have invented a certain new and useful Improvement in Means and Appliances for Manufacturing Tubular Cast Shells of Gold or Like Metal, of which the following is a full, clear, and exact description, reference being had to the drawings which accompany and form a part of this specification, in which—

Figure 1 is a vertical section through the middle of the apparatus which I employ. Fig. 2 is a cross-section along the dotted line $x\,x$ of Fig. 1, the supporting-standard S not being shown. Fig. 3 is a top view showing the central core and the pour-hole; and Fig. 4 is a cross-sectional view through $x\,x$ of Fig. 1, showing in detail the construction of the non-conducting core-covering E.

The lettering in all the figures is uniform.

My invention relates to the manufacture of cylindrical or substantially cylindrical tubular shells of gold or other ductile metal or alloy, such as are used for the outer layers of compound ingots, the central core being of a different and preferably a baser metal, the whole when formed up and the different parts united by solder or otherwise adapted to be drawn down or otherwise reduced into wires or the like for the manufacture of articles of jewelry, although my means and appliances are adapted for the production of like shells applied or capable of being applied to other purposes. In the manufacture of such tubular shells it is a matter of the highest importance that the metal should remain homogeneous after being completed and that the shells shall be free from seams, splits, or strains, since otherwise when being reduced by pressure applied from without to the compound ingot the gold surface will draw irregularly upon the base-metal core and its thickness will be variable, or it may be torn, split, or broken from the core altogether and a large expense from loss be thereby incurred, not only in time and labor, but in the value of the metal itself. My purpose also is to facilitate and cheapen the method of manufacture and the rapidity of production, as well as to avoid loss of time and material in finishing up the interior surfaces of these shells preparatory to uniting them to their base-metal cores, a perfect fit being requisite thereto.

Referring to the drawings, S represents a support or standard in which the mold is seated or to which it is secured. As shown at S', this standard is bored transversely, and a cross-pin P is fitted in said standard, so as to extend across the central opening $S^2$. The standard S is socketed at $S^3$ to receive the hollow mold B, which is inserted at $S^4$ and is made to closely grasp the mold. B is the hollow mold or mold proper, which is shown in cross-section in Fig. 2. It is composed of two lateral halves adjusted to each other by the dowels $b\,b\,b\,b$, Figs. 1 and 2. The lower end of this mold is turned inward at B', so as to make contact with and accurately center the metal core A. The upper end of the mold B is left open, and in it is fitted the cap C, Figs. 1 and 3, which extends above the same and is centrally bored to accurately fit the upper end of the core A, which projects through it, and is also provided with a tapered pour-hole D, extended through said cap C and through which the molten metal is poured into the hollow of the mold. Through the center of the hollow center of this mold B extends vertically the solid core A, made, preferably, of polished steel and slightly tapered from below upward, so that when the cross-pin P has been removed the said core can be driven out of the cast-metal shell from above downward. At its lower end the core A is provided with a shouldered offset A', making the lower portion somewhat larger in diameter than the core above, and this enlargement accurately fits the corresponding perforation within the inturned lower ends of the halves of the mold-casing B'. Around this steel core is placed, accurately fitted thereto, a tubular covering of a slightly-elastic material which is a high insulator or non-conductor of heat and which is also non-combustible and which will not decompose, so as to generate gases when highly heated. For this purpose I prefer to use a thin sheet of asbestos sheeting perfectly even in thickness throughout and which for ordinary use may be one-eighth of an inch in thickness, varying with the requirements of the size or material to be manufactured. The two edges of this sheet of asbestos must not be overlapped or a seam will occur in the casting and the product be made defective. To avoid this, I take a strong sheet of brown and unsized paper, which I roll around the core and glue the layers of paper and asbestos together, so as to make a thin light roll of a single layer of paper, with the ends flush against each other, or of two or more layers accurately fitted for evenness of overlap. I cut the asbestos sheeting to fit precisely around the core, the edges flush against each other and not overlapping, and I cement with mucilage or glue the asbestos covering to the paper lining, so that when drawn off the core they may be laid away until required for use. After forming the paper and asbestos roll upon the core and while still in place I rub the outer surface all over with paraffin, after which I sprinkle it thoroughly with powdered charcoal, which causes the molten metal to run easily and smoothly over the outside of the asbestos roll and leaves it when cool with a perfectly smooth inside. In casting my tubular shells I apply one of these asbestos and paper lined core-coverings to the slightly-tapered steel core A, sliding it on at its upper or thinner end and firmly seating it by means of the taper of the steel core, as already described. It will be seen in Fig. 1 that the asbestos covering and the shoulder A' of the core at its lower end are below the upper margin of the inturned end of the mold B'. By this means the asbestos covering is clamped and compressed by the two sides of the mold when brought together and it is not possible for any metal to escape around the core A, nor for contact to take place between the molten metal and the steel core. At its upper end, before the cap C is applied, the upper margin of the asbestos covering is constructed to fit closely to said cap C, and if it be too long I cut it off by a knife applied around the core, so as to make a close fit, and thereby exclude contact between the molten metal and the steel core at any part, while at the same time contact is made on the outside in all parts between the molten metal and the inside of the mold B, which is made of steel, iron, or other suitable metal. In this way and by these means I am enabled to prevent chill of the inside of my cast-metal shell while in a tubular but molten state, the cooling proceeding from without inward and without strain or internal splits or weak spots, which necessarily occur when the cooling or chill proceeds from both sides at the same time or from within outward without internal support while changing from a molten to a solid state. The contraction in cooling I also compensate for without strain by the elasticity of the interposed asbestos covering, so that by the use of my method and appliances much greater rapidity is secured and a more perfect shell obtained. The rapidity of production obtained over the use of sand cores is very great, as two or three dozen of these asbestos and paper coverings can be made during the time required to make one accurate sand core, the result being vastly superior besides. When the mold has been prepared, the molten metal is poured in at the pourhole D, and after cooling sufficiently the crosspin P is pulled out, and by a blow on the projecting upper end of the steel core A the latter, being slightly tapered, as above described, drops down through the hole $S^2$ in the support or standard S, and the mold-casing B being opened the shell is removed and the paper and asbestos lining is pulled out. A new covering is then slipped over the core A and the process repeated indefinitely. The method of manufacture is perfectly clean, the shells coming out with smooth inside and outside surfaces and perfectly even texture throughout, only requiring a slight surfacing inside to adapt them to receive the base-metal cores in the manufacture of compound ingots, as already described.

I do not in my invention confine myself rigidly to the precise construction of the different parts of my appliances or the method of use as specifically set forth in this specification or drawings, but vary the same when required to meet the various circumstances of the special case, as would be done by any mechanic skilled in the art to which my invention pertains and without departing from the principles thereof as herein shown, described, and claimed.

Having now described my invention, what I claim, and desire to secure by Letters Patent, is—

1. The means for casting tubular shells of gold or the like consisting in an external hollow metallic mold, vertically divided into lateral segments detachable from each other, and adapted to be clamped together, means for clamping said segments together, comprising a base having a socket therein adapted to receive and hold said segments in position, a solid core longitudinally extended through said mold, and maintained in a definite position therein when said segments are clamped together, in combination with a detachable tube of asbestos sheeting interposed between the solid surface of said core and the space for cast metal in said metallic mold, substantially as and for the purposes described.

2. The means for casting tubular shells of gold or the like, consisting of a hollow metallic mold, vertically divided into two or more lateral segments detachable from each other having inturned lower ends and adapted to be clamped together, and a solid metallic core detachably fixed within said mold, parallel with said segments and held in place by said segments when clamped together; and, in combination therewith, and detachable therefrom, a tubular covering of asbestos sheeting of a substantially equal thickness throughout, said asbestos covering extended along said metallic core, surrounding the same, and clamped at its lower end by the inturned lower ends of the segments of said mold, so that contact of the molten metal with said core shall be prevented, substantially as described.

3. The means for casting tubular shells of metal consisting of a hollow metallic mold, vertically divided into detachable lateral segments adapted to be clamped together when in use, a vertical solid metallic core extended through said mold and detachable therefrom by the separation of said segments, means for clamping together the lateral segments of said mold, comprising a base having a socket therein adapted to receive and hold said segments in position, and, in combination therewith, a detachable tube of flexible sheet-asbestos, applied upon said metallic core, substantially as and for the purposes described.

4. In combination with a hollow mold, and a core, a tubular core-covering consisting of an inner layer of paper, and an external layer of asbestos sheeting, applied to each other in tubular form, so as to break joints, and cemented together, and dried, substantially as described.

5. In combination with a mold and metallic core, a tubular core-covering adapted to be detachably applied to and around said metallic core, in the casting of tubular metallic shells, the covering consisting of an inner layer of fabric, having a stronger fiber than asbestos and an outer layer of asbestos, secured together, and of an equal thickness throughout, said tubular core-covering having its external surface treated with a pulverulent layer of carbon secured thereto, substantially as and for the purposes set forth.

6. In combination with a hollow mold and a metallic core, a tubular core-covering for said metallic core, consisting of a tubular layer of paper, and, secured to it, an outer covering of asbestos sheeting in tubular form, the free margins of each of said layers, when formed up into said tube, cemented to the adjacent face of the opposite fabric, so as to break joints, one layer with the other, the outer surface of said asbestos covering coated with paraffin and treated with pulverulent carbon applied thereto, substantially as described.

7. In combination with a solid polished metal core slightly tapered from below upward, an external hollow metallic mold consisting of two or more vertical segments, detachable from each other, provided with guides for accurate fitting thereof together, and adapted to be clamped together to form said hollow mold, a base having a socket therein adapted to receive and hold said segments in position, said mold having an interspace between its inner walls and the said core, a detachable tubular core-covering of a slightly-elastic and non-combustible material, and a poor conductor of heat, said core-covering being in the form of a permanent, peripherally-closed tube, adapted to fit closely around said core from one end of said mold to the other, together with an opening to said hollow mold through which cast metal may be poured into the same, substantially as described.

8. In combination with a tubular, vertically-divided mold, with segments adapted to open laterally, said segments having their lower ends inturned, a longitudinal metallic core extended through said mold, tapered from below upward, and its lower portion detachably secured in the opening between the said inturned lower ends of said segments, and a detachable cap, having a central opening and a pour-hole, detachably secured to the upper part of said mold, the upper end of said core seated in said opening in said cap, together with a socketed external support for said segments, the bottom of said socket centrally perforated, and provided with a detachable temporary detent for supporting said core during the operation of casting, said detent, when removed, adapted to release said core, and permit the same to be driven down through said perforated socket, and out of said mold, and a tubular core-covering of asbestos surrounding said core, the lower end thereof clamped between the inturned lower ends of said segments and said core, substantially as described.

9. In a device for casting tubular shells of gold or the like, a supporting standard or base, a removable detent for supporting the core, and means for supporting the mold, a hollow mold supported upon said standard, said mold vertically divided into two lateral halves detachable from each other, clamps and guides for holding the same in place, a perforated cap supported upon the upper end of said mold, said cap centrally perforated and provided with a pour-hole, a metallic core extended through said perforated cap, and through said hollow mold, and supported upon said detent in said standard, said core slightly tapered from below upward, and firmly secured in place in said mold, together with a tubular core-covering applied around said core, and its lower end extended below the inside of said hollow mold, and clamped between said core and said mold by means of an inturned lower part thereof, the whole constructed substantially as and for the purposes described.

10. In combination with the polished metal core A, gradually thickened in diameter from above downward, and having shouldered expansion A', at its lower end, hollow metallic mold B, having lower inturned end B', said mold being made in lateral segments adapted to be clamped together for use, means for clamping said segments together, cap C, having central perforation adapted to receive the upper end of core A, said core projecting upwardly through said cap, and said cap having pour-hole D, base S having central perforation S², and detachable detent P, together with tubular core-covering E, of asbestos sheet, its lower end clamped between A and B', above A', substantially as described.

11. In combination with hollow mold, B, cap C, and core A, said mold formed of separate vertical segments laterally detachable from each other, the tubular compound core-covering E, consisting of a tubular support of flexible fabric E', and a covering of soft asbestos sheeting E, said two layers cemented together and dried, said core-covering being of equal thickness throughout, and covered with an external facing of carbon or like substance, said core-covering detachable from said core in tubular form, substantially as and for the purposes described.

In testimony whereof I have hereunto affixed my signature this 6th day of January, A. D. 1900.

HENRY R. BAKER.

Witnesses:
 HAROLD E. SWEET,
 PHILIP E. BRADY.